2 Sheets—Sheet 1.
C. G. CROSS.
Check-Row Planter.
No. 210,998. Patented Dec. 17, 1878.
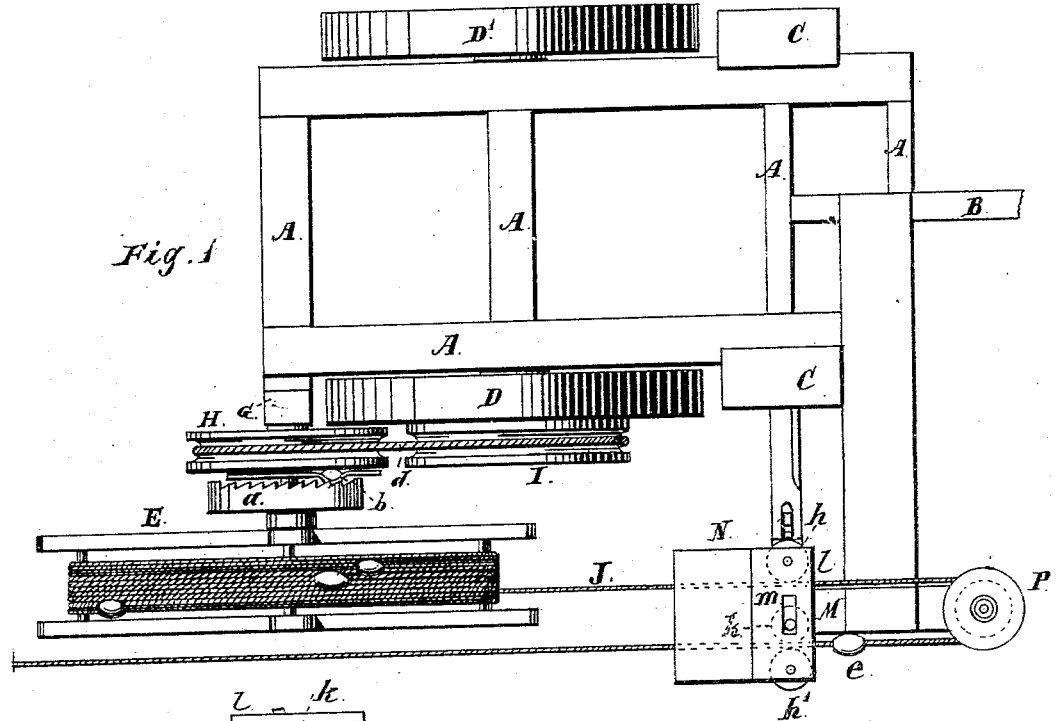
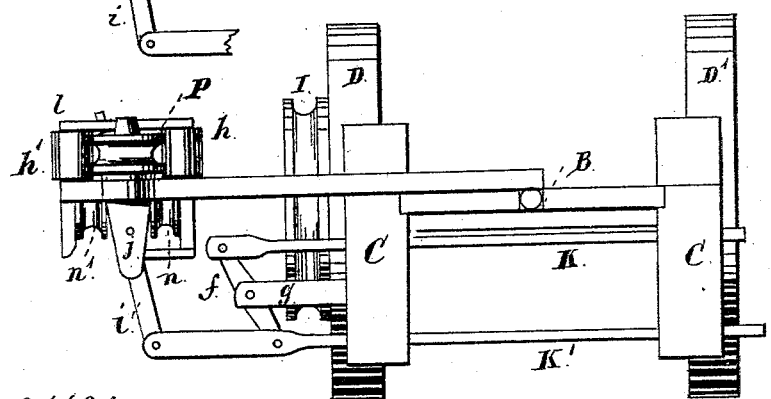
Witnesses.
Inventor:
Christopher G. Cross

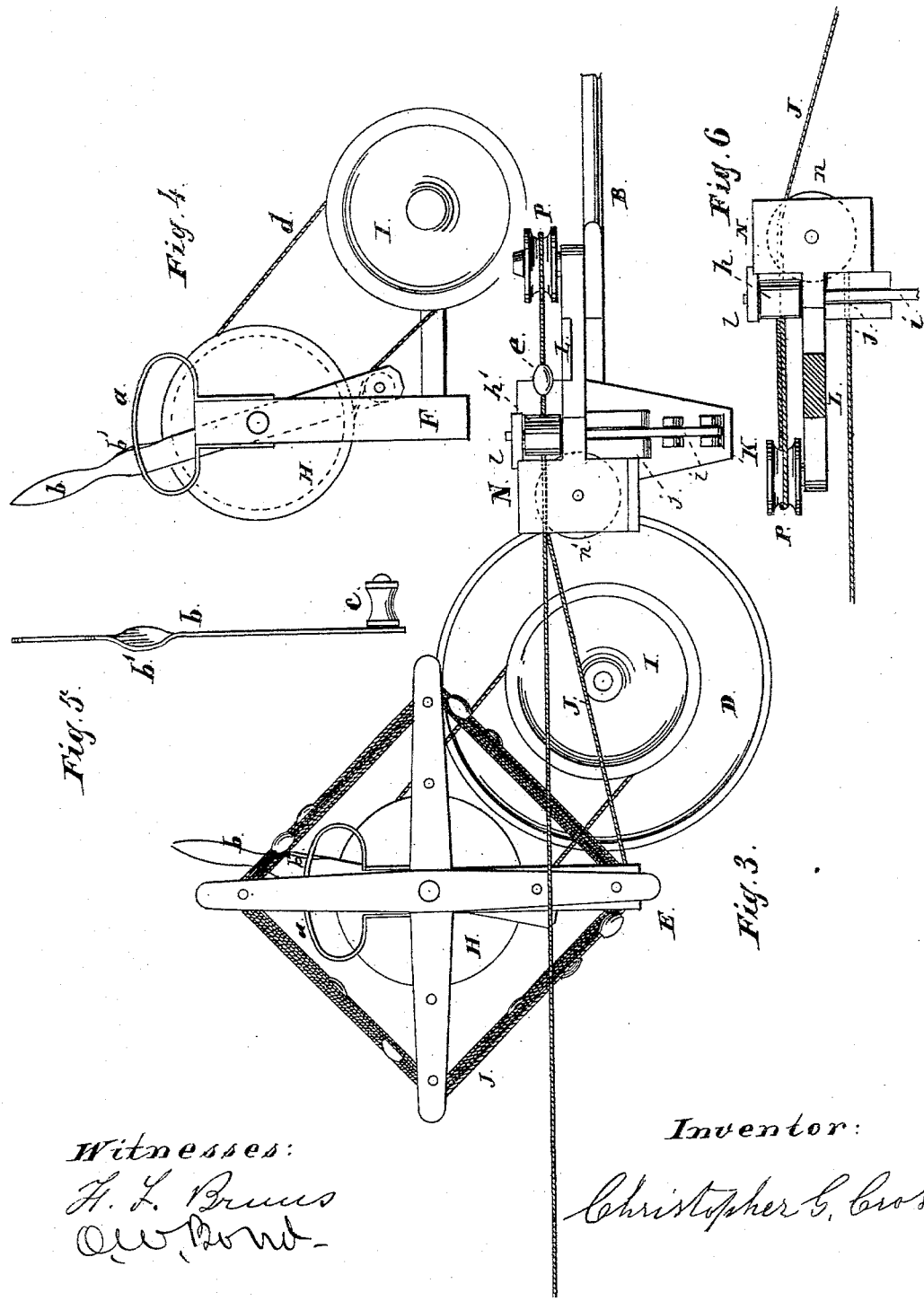

UNITED STATES PATENT OFFICE

CHRISTOPHER G. CROSS, OF CHICAGO, ILLINOIS.

IMPROVEMENT IN CHECK-ROW PLANTERS.

Specification forming part of Letters Patent No. 210,998, dated December 17, 1878; application filed September 18, 1878.

*To all whom it may concern:*

Be it known that I, CHRISTOPHER G. CROSS, of Chicago, Cook county, State of Illinois, have invented a new and useful Improvement in Check-Row Planters, of which the following is a full description, reference being had to the accompanying drawings, in which—

Figure 1 is a plan; Fig. 2, a front elevation of the parts shown. Fig. 2ª is a front view of the parts shown, the pulley P being removed. Fig. 3 is a side elevation. Fig. 4 is a detail. Fig. 5 is a detail. Fig. 6 shows the position of the cord after the machine has first crossed the field and been turned around.

My invention relates to that class of corn-planters known as "check-rowers," and using a knotted cord. Heretofore such cord has been stretched across the field and secured at each end, the machine passing under such cord when planting, and it has been necessary to move each end of the cord as often as the machine reaches it.

The chief object of my invention is to construct a check-rower so that, while the seed-slides are actuated by a knotted cord, such cord will be paid out while the machine is planting and moving across the field in one direction, and will be taken up while the machine is planting and moving across the field in the opposite direction.

Another object of my invention is to provide new devices for actuating the seed-slides, adapted to be operated by balls upon a cord.

The first object I accomplish by means of a reel, which carries the knotted cord, so mounted on the machine that the cord will be unwound from the reel when the machine is moving in one direction, and will be wound upon the reel when the machine is moving in the opposite direction, as more fully hereinafter set forth.

The devices adopted for operating the seed-slides will be understood from the description hereinafter contained.

In the drawings, A represents the frame of a corn-planter; B, the tongue; C, the seed-boxes; D D', the wheels upon which the frame is mounted. I have not shown furrow-openers, but they will be used.

My improvements are designed to be used with any of the many styles of corn-planters now in use with which they can be connected; and in actual use the frame and seed boxes will not be used, as shown.

E is a reel, the shaft of which is supported in two posts, F G, located at one corner of the main frame, as shown. The reel is outside of both posts F G.

H is a pulley secured to the reel-shaft between the posts F G. I is a fixed pulley upon the outside of the wheel D. J is a cord provided with balls or knots, as usual, except that with my devices they can be located twice as far apart as the distance between the rows or plants. K K' are seed-slides. L is a bar secured at one end to the frame, and projecting to one side thereof. M is a short bar secured to the outer end of L. N is a small frame supported by the bar M, in which pulleys and rollers are located, as fully set forth hereinafter. P is a pulley upon the forward end of the bar M.

$a$ is a notched bar upon the upper end of the post F. $b$ is a lever, upon the lower end of which is a roller, $c$. This lever is pivoted to the post F, and at $b'$ engages with the notched bar $a$. $d$ is a belt upon the pulleys I H, by means of which the reel is driven. The roller $c$ comes in contact with the under side of the belt $d$, and this belt can be tightened more or less by the use of the lever $b$.

$f$ is a lever pivoted at its center to the fixed bar $g$ and at each end to the seed-slides K K' respectively, as shown in Fig. 2. $h\ h'$ are two rollers. $i$ is a lever pivoted at $j$ to a pendant from M, or to some part of the frame N. The lower end of this lever $i$ is pivoted to the outer end of the lower seed-slide, K', and on its upper end is a roller, $k$, located between $h$ and $h'$. $l$ is a small cross-piece or cap above the rollers to keep them in place; and $m$ is a slot in $l$, through which the upper end of the lever $k$ passes. $n\ n'$ are two pulleys in the frame N, over which the cord J passes.

The distance from the center of the roller $h$ around the pulley P, then back to the center of $h'$, is equal to the required distance between the plants.

In use the cord J is wound upon the reel E and the machine taken to one end of the field to be planted, where the free end of the cord is to be secured to a stake or other device. Then the machine is to be drawn across the field along the line of planting, the cord J passing over the pulley $n$, around the pulley P, then back over the pulley $n'$ to the stake, as shown in Figs. 1 and 3.

As the machine passes along the knots or balls $e$ will pass, one after another, first between the two rollers $h$ and $k$, and then, passing around the pulley P, will pass between the rollers $h'$ and $k$, by which operation the upper end of the lever $i$ will be alternately forced over to the right and left, thus operating the seed-slides.

The outer rollers, $h$ $h'$, are upon fixed pins; but the middle roller, $k$, is on the lever $i$, and these rollers are so arranged relatively to each other that the balls or knots cannot pass between them without forcing the roller $k$, and with it the upper end of the lever $i$, over to one side.

The seed-slides are so constructed that corn will be dropped with each movement of the lever $i$. Each ball during the passage of the machine across the field operates the lever $i$ twice, first moving it one way, then in the opposite direction; hence the distance between the balls is double that between the plants.

While the machine is passing across the field the first time the belt $d$ must be loose, so that it will not drive the reel; and the cord J will be gradually unwound from the reel, the reel-shaft being free to rotate in its bearings. When the machine reaches the opposite end of the field the cord will be stretched across the field, one end being at the stake before mentioned, the other end being upon the reel, two rows having been planted while the machine was crossing the field.

Returning, the operation is as follows: The machine is turned around and placed at the proper distance from the rows last planted, and the cord is passed around the pulley $n'$ instead of simply over it, bringing the cord into the position shown in Fig. 6. The belt $d$ must then be tightened so that it will drive the reel, which can be done by means of the lever $b$ and tightening-roller $c$, and the reel, rotating in a direction opposite to that in which it moved when the machine first crossed the field, will take up the cord as the machine moves along.

It is necessary that the cord between the machine and the stake be kept taut, and this result can be secured by making the reel a little larger than the drive-wheel D.

By means of the lever $b$ the tension of the belt $d$ can be so adjusted that if more strain comes on the cord and reel than is required the belt will slip. The lever $b$ is to be within reach of the driver, and he can adjust the tension of the belt as may be necessary. The rollers are so arranged that the balls can pass between them from front to rear and from rear to front.

The two operations described can be repeated as often as may be desired, the stake being moved as often as the machine returns to the end of the field from which it started. When used as described, only one stake is used, and that is only moved as often as four rows have been planted.

What I claim as new, and desire to secure by Letters Patent, is as follows:

1. In a corn-planter, a reel, E, adapted to carry a cord, J, connected and combined with the planter, substantially as described, and with devices for operating the reel, so that the cord will be paid out from the reel when the machine moves across the field in one direction, and be taken up onto the reel when the machine moves in the opposite direction, and operate the check-row mechanism both ways, for the purpose set forth.

2. In combination with the dropping devices of a corn-planter and a check-row cord, a reel, E, pulleys H I, belt $d$, and devices for tightening the belt, substantially as specified.

3. In combination with seed slide or slides of a corn-planter, the lever $i$, rollers $h$ $h'$ $k$, and cord J, for the purpose of operating the seed-slides by the action of the knotted cord, substantially as and for the purpose set forth.

4. The lever $i$, rollers $h$ $h'$ $k$, and pulleys P $n$ $n'$, in combination with the seed-slide and cord J of a planter, substantially as and for the purpose set forth.

CHRISTOPHER G. CROSS.

Witnesses:
O. W. BOND,
H. F. BRUNS.